United States Patent [19]
Horiguchi

[11] 3,915,911
[45] Oct. 28, 1975

[54] PROCESS FOR PREPARING A FLAMEPROOFING COMPOSITION

[75] Inventor: Shojiro Horiguchi, Hoya, Japan

[73] Assignee: Dainichiseika Color & Chemicals Mfg., Co., Ltd., Tokyo, Japan

[22] Filed: June 3, 1974

[21] Appl. No.: 475,996

[30] Foreign Application Priority Data
July 30, 1973 Japan.............................. 48-84954

[52] U.S. Cl............. 260/17.5; 106/15 FP; 252/8.1; 260/124 C; 260/124 R; 260/DIG. 24
[51] Int. Cl.$^2$...................... C08F 45/58; C08F 3/30
[58] Field of Search..... 260/124 C, 124 R, DIG. 24, 260/17.5; 252/8.1; 106/15 FP

[56] References Cited
UNITED STATES PATENTS

| | | | |
|---|---|---|---|
| 3,407,188 | 10/1968 | Cavagna........................ | 260/124 R |
| 3,464,921 | 9/1969 | Erler et al..................... | 260/124 R X |
| 3,484,397 | 12/1969 | Szalay et al..................... | 260/17.5 |
| 3,627,767 | 12/1971 | Nachbur et al................ | 252/8.1 UX |
| 3,642,621 | 2/1972 | Hollows....................... | 106/15 FP X |
| 3,676,389 | 7/1972 | Putnam et al................. | 106/15 FP X |
| 3,784,493 | 1/1974 | Giguere et al................. | 260/17.5 X |
| 3,811,992 | 5/1974 | Handa et al................... | 252/8.1 X |
| 3,822,225 | 7/1974 | Braddon et al................ | 260/17.5 |

*Primary Examiner*—Melvin Goldstein
*Assistant Examiner*—Thomas De Benedictis, Sr.
*Attorney, Agent, or Firm*—Oblon, Fisher, Spivak, McClelland & Maier

[57] ABSTRACT

A flameproofing composition is prepared by co-melting a lignin compound with a urea compound.

5 Claims, No Drawings

PROCESS FOR PREPARING A FLAMEPROOFING COMPOSITION

BACKGROUND OF THE INVENTION

1. Field of the Invention

This invention relates to a process for preparing a novel flameproofing composition.

2. Description of the Prior Art

It is well-known that certain nitrogen compounds, phosphorous compounds, halogen compounds and antimony trioxide are effective as flameproofing agents and flame retardants. It is also well-known that certain organic or inorganic compounds which generate incombustible nitrogen gas or carbon dioxide gas by thermal decomposition, chemical reaction or a combination thereof, have a similar effect as flameproofing agents and flame retardants.

However, these prior art flameproofing agents and flame retardants are solids which are difficultly oxidized or are compounds which generate incombustible gases which are difficultly oxidized by thermal decomposition, and thus prevent contact of oxygen with the flameproofed material for awhile. That is, the flameproofed material is isolated from oxygen for awhile by the incombustible gas layer. Since the layer separating the material from oxygen is a gas, the gas will quickly depart from the flameproof material when contacted with a flame and the separating effect is thus of short duration.

When halogen compounds are used as flameproofing agents, toxic halogen gases or hydrogen halide gas is formed by the decomposition of the halogen compounds. These compounds are clearly unsatisfactory.

A need exists therefore for a safe, long-lasting flameproofing agent.

SUMMARY OF THE INVENTION

Accordingly, one object of the present invention is to provide a novel flameproofing composition which has a long flameproofing duration without forming toxic gases.

This object and other objects of the present invention as will hereinafter become more readily apparent can be attained by heat-melting a lignin, ligninsulfonic acid or lignin sulfonate with urea or a derivative of urea; or by heat-melting a lignin, ligninsulfonic acid or lignin sulfonate with urea or a derivative of urea followed by admixing with a thermoplastic resin, a thermosettable resin, phosphoric acid, a phosphoric acid derivative or a polyvalent metal salt.

DETAILED DESCRIPTION OF THE PREFERRED EMBODIMENTS

The lignin used in this invention is obtained from woody materials such as wood, bamboo and straw and contains high molecular weight compounds having a network structure condensed with phenylpropane groups having the formula

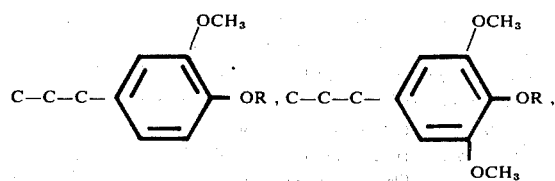

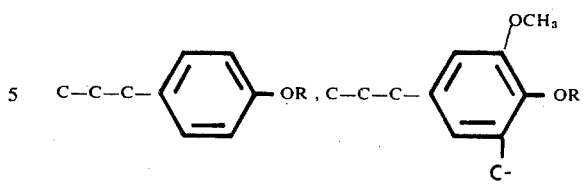

The lignin sulfonic acid (lignosulfonic acid) can be obtained by treating lignin with sulfurous acid, hydrogen sulfite or sulfite salts. The alkali or alkaline earth metal (e.g., Na, K, Mg, Ca, Ba) salts or the ammonium salt of lignin sulfonic acid, prepared by neutralizing lignin sulfonic acid, can be also used in the invention. Lignin, lignin sulfonic acid and salts of lignin sulfonic acid are well-known and are economically and readily available.

Suitable urea and urea derivatives include urea, guanamine, thioureas, alkylureas (e.g., methylurea, ethylurea), lower alkylthioureas, methylolurea, biuret, inorganic acid salts of urea or the like.

Suitable derivatives include phosphorous acid, hypophosphorous acid, phosphoric acid, metaphosphoric acid, polymetaphosphoric acid, polyphosphoric acid and alkali or alkaline earth metal salts thereof, and the other known phosphorous containing flameproofing agents. The polyvalent metal salts used in this invention can also be known flameproofing agents.

The thermoplastic resins and thermosettable resins used in the invention improve the adhesion, compatibility and affinity of the flameproofing compositions to a combustible substrate and suitably include polyolefins, polyamides, polyesters, urea type, phenol type and amino type resins or the like.

The ratio of raw materials is preferably 0.3–10 wt parts of urea or urea derivatives to 1 wt part of the lignin, lignin sulfonic acid or lignin sulfonate. The amounts of the other additives are dependent upon the nature of the combustible substrate to which the flameproofing composition is to be applied and are usually 1–200 wt % of the total of the urea and lignin.

The flameproofing composition can be prepared by mixing the raw materials at a temperature higher than 130°C, preferably higher than 170°C, for 2–20 hours with stirring in a melted condition. The flameproofing composition so prepared is a brittle solid. When the brittle solid is kneaded with rubber or a synthetic resin, an easily kneadable highly viscous cake will be obtained. The viscosity of the viscous cake decreases with rising temperature and the cake changes to a tacky liquid at temperatures higher than 200°C.

The flamproofing composition is high in nitrogen and is incombustible. When the flameproofing composition is impregnated on a combustible substrate, the combustible substrate becomes incombustible. When the substrate treated with the flameproofing composition is placed in fire, the flameproofing composition of the reaction product oozes out onto the surface of the substrate at a rate dependent upon the rate of increase in the fire and temperature. The flameproofing composition covers the substrate in the form of a polymerized compound, but not in a gaseous form, whereby the presence of oxygen is eliminated for a long time and an excellent flameproofing effect is imparted to the material. Accordingly, the reaction product is useful as a flameproofing composition for treatment of combustible substrates. When phosphoric acid or a salt thereof is added to the reaction product with or without a polyvalent metal salt, the flameproofing effect increases significantly.

Having generally described the invention, a more complete understanding can be obtained by reference to certain specific examples, which are included for purposes of illustration only and are not intended to be limiting unless otherwise specified.

EXAMPLE 1

4 wt parts of urea were mixed with 1 wt part of sodium lignin sulfonate prepared from a waste pulp solution from sulfite pulp. The mixture was heated with a flame in a flat bottom iron vessel equipped with a stirrer whereby ammonia gas was generated above the melting point of urea (130°C). The ammonia gas was introduced into dilute sulfuric acid from a chimney to prevent discharge of ammonia gas. The mixture was heated to 170°C for about 1 hour and was kept at 170°C for 3 hours with stirring. After a decrease in the generation of ammonia gas, the mixture was further heated to 200°C and kept at 200°C for 2 hours to complete the reaction. When the generation of ammonia gas was almost finished, the heating was stopped and the mixture was naturally cooled with stirring.

The viscosity of the reaction mixture increased depending upon the cooling rate. Accordingly, the reaction mixture still having fluidity (140°C –150°C) was poured out into a flat vessel having a high surface area which was divided with iron lattices into many sections so as to cool the reaction mixture quickly. A brittle, resinous flameproofing composition having a brownish black color resulted.

The flameproofing composition was water soluble and imparted an excellent flameproofing effect when applied as follows:

1. A polyvalent metal ion such as $Ba^{+2}$, $Ca^{+2}$, $Al^{+3}$, $Pb^{+2}$, $Pb^{+4}$, $Cu^{+2}$, $Fe^{+2}$, $Fe^{+3}$, $Sn^{+2}$, $Sn^{+4}$ or $Zn^{+2}$ ion was impregnated on a fabric, dried and the treated fabric was passed through the flameproofing composition bath to insolubilize the flameproofing composition in or on the fabric. An incombustible fabric which can be bleached with a bleaching agent, if necessary, was obtained.

2. Wood or plywood was dipped into an aqueous solution of the flameproofing composition for a long time or was impregnated with the flameproofing composition under pressure. The treated wood or plywood was dipped into a solution of a polyvalent metal salt to insolubilize the flameproofing composition to obtain incombustible wood or plywood.

3. To a 3% aqueous solution of the flameproofing composition was added with vigorous stirring a dilute solution of a polyvalent metal ion to insolubilize the flameproofing composition whereby a fine crystalline precipitate was obtained. The precipitate was separated from water with a suitable filter, and was added to pulp used in paper manufacturing whereby incombustible paper was obtained.

EXAMPLE 2

In the apparatus of Example 1, sodium lignin sulfonate was precipitated under acidic conditions with hydrochloric acid. 5 wt parts of urea were mixed with 1 wt part of the dried lignin sulfonic acid. The mixture was heat-melted as in Example 1. After completing the reaction, 0.3 wt part of a saturated aqueous solution of barium chloride was added dropwise to the reaction mixture at about 120°C with stirring, whereby the viscosity gradually increased. Accordingly, the mixture was vigorously stirred to obtain a uniform reaction mixture. When the viscosity became especially high, the viscosity of the mixture was controlled by heating. 0.24 wt part of calcium carbonate was uniformly added to the reaction mixture, the water was substantially evaporated, and the reaction mixture was poured out onto the flat iron latticed vessel of Example 1 to cool quickly, whereby a flameproofing composition was obtained.

The calcium carbonate was added for neutralization. Accordingly, sometimes such addition is unnecessary depending on reaction conditions. The flameproofing composition may be applied as follows:

1. Unvulcanized rubber was admixed with the flameproofing composition to the extent of 5–20% by weight of the rubber. The mixture was kneaded, whereby the flameproofing composition changed, by heat of friction, from a brittle solid to a viscous liquid, which was well mixed. After molding, the mixture was vulcanized to obtain an incombustible rubber article. In order to improve the mechanical properties of the rubber article upon cooling, chloro-paraffin in the ratio of about ⅓ of the flameproofing composition is preferably added.

2. In molding a synthetic resin, such as polyethylene, polystyrene, or polymethylmethacrylate, the flameproofing composition can be added in the same manner as (1) to obtain a result similar to (1).

3. When the flameproofing composition was heated to achieve suitable viscosity and was coated onto a fabric, especially a woven fabric which is not required to have a soft feeling, such as canvas or jute bags, a fabric with good flameproofing properties can be obtained. The flameproofing effect will increase by adding a formaldehyde resin, urea-formaldehyde resin, melamine-formaldehyde resin or the like. When softness is required, chloroparaffin is preferably added during or after the coating step.

EXAMPLE 3

3 wt parts of urea were mixed with 1 wt part of lignin sulfonic acid as in Example 2, and the mixture was heat-melted at 180°C for about 3 hours to complete the reaction. 1 wt part of phosphorous oxychloride was gradually added to the reaction mixture at 180°C and the mixture was kept at 180°C for about 1 hour after the addition to complete the reaction. The reaction product was cooled and removed as in Example 1. The reaction product was a water soluble viscous flameproofing composition having less brittleness than that of Example 1. The flameproofing composition imparted excellent flameproofing effects when applied as in Example 1.

EXAMPLE 4

4 wt parts of urea were mixed with 1 wt part of sodium lignin sulfonate and the mixture reacted under the conditions of Example 1. The heating was stopped at 200°C and the reaction mixture was cooled with stirring. 1 wt part of phosphoric acid ($H_3PO_4$) was added dropwise at 170°C, followed by 0.24 wt part of calcium carbonate. The water was removed and the reaction product was rapidly cooled to obtain a flameproofing composition. The calcium carbonate was added for neutralization. Accordingly, sometimes, such addition is unnecessary, as set forth in Example 2. The flameproofing composition was water-insoluble and imparted excellent flamproofing effects when applied as in Example 2. The flameproofing compositions prepared by the processes of Examples 1–4 may be treated with formaldehyde to obtain a thermosettable, resinous primary condensate. An insoluble, incombustible thermosettable resin may be obtained by heating the thermosettable resinous primary condensate to form a network structure.

EXAMPLE 5

2 wt parts of urea and 1 wt part of phosphoric acid were mixed with 1 wt part of lignin and the mixture was kneaded to form a uniform slurry. The slurry was heated in the same manner as Example 1 to obtain a water soluble resinous flameproofing composition. The flameproofing composition was diluted with water to form a 3% aqueous solution, and a dilute aqueous solution of a polyvalent metal ion was added to the 3% aqueous flameproofing solution with vigorous stirring to obtain a fine precipitate. A water-insoluble flameproofing composition was obtained by separating the precipitate from the water with a filter. The applications of the flameproofing composition were the same as those of Examples 1 and 2.

By the process of this invention, excellent flameproofing compositions which are useful industrially for fire prevention are obtained.

Having now fully described the invention, it will be apparent to one or ordinary skill in the art that many changes and modifications can be made thereto without departing from the spirit or scope of the invention as set forth herein.

What is claimed as new and intended to be covered by Letters Patent is:

1. The process for preparing a flameproofing composition which comprises heat-melting a lignin compound selected from the group consisting of lignin, lignin sulfonic acid and a salt of lignin sulfonic acid with a urea compound selected from the group consisting of urea, guanamine, thiourea, lower alkylureas, lower alkylthioureas, methylolurea, biuret and inorganic acid salts of urea.

2. The process for preparing a flameproofing composition of claim 1, wherein 0.3–10 parts by weight of the urea compound is co-melted with 1 part by weight of the lignin compound at a temperature higher than 130°C.

3. The process for preparing a flameproofing composition of claim 1, wherein 1–200% by weight of a thermoplastic of thermosetting resin is mixed with the co-melted reaction mixture.

4. The process for preparing a flameproofing composition of claim 1, wherein phosphorous acid, hypophosphorous acid, phosphoric acid, metaphosphoric acid, polymetaphosphoric acid, polyphosphoric acid, phosphorous oxychloride or alkali or alkaline earth metal salts thereof is mixed with the co-melted reaction mixture.

5. The process for preparing a flameproofing composition of claim 1, wherein the flameproofing composition is treated with a water soluble polyvalent metal salt.

* * * * *